Patented Sept. 16, 1924.

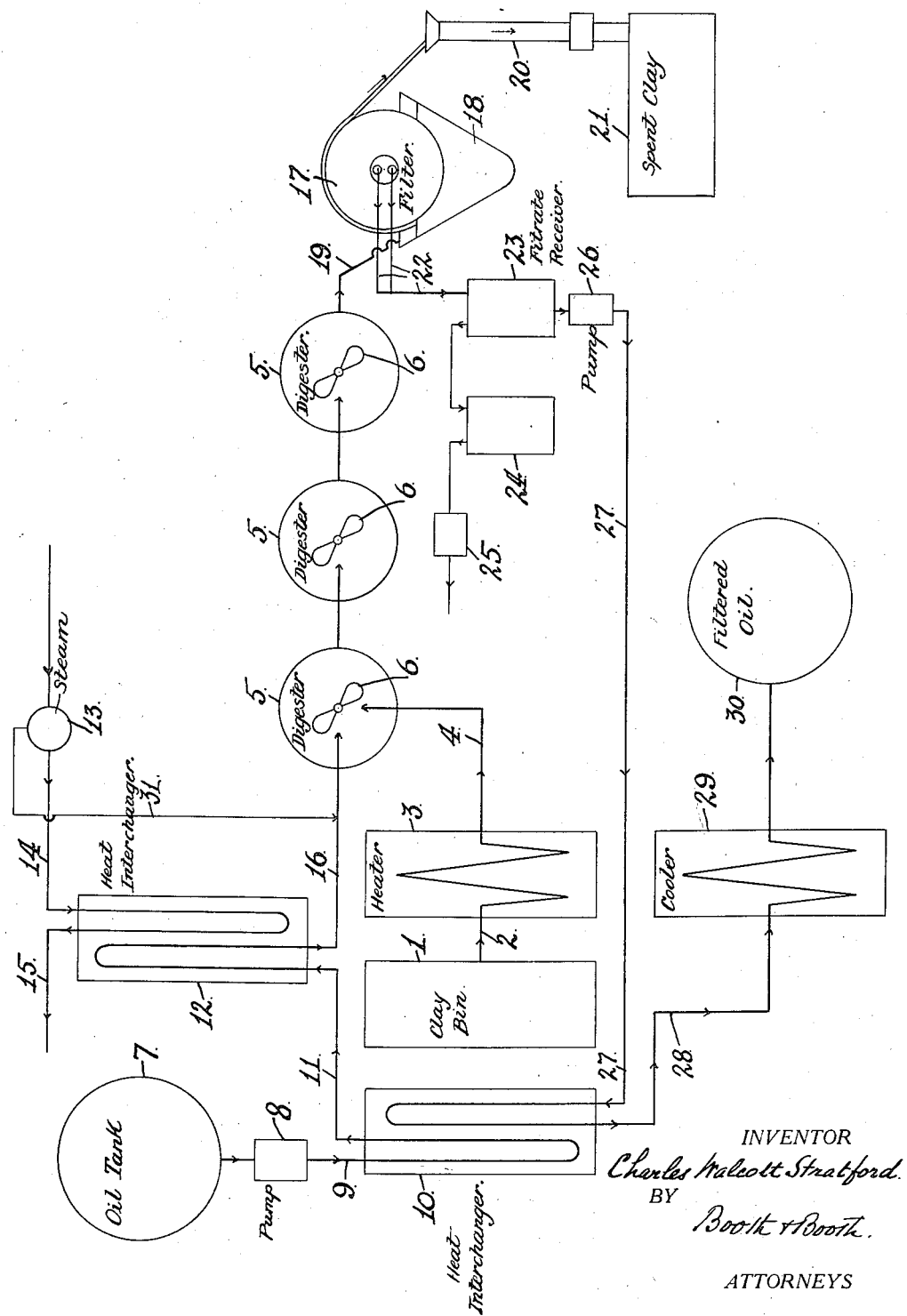

1,508,625

UNITED STATES PATENT OFFICE.

CHARLES WALCOTT STRATFORD, OF SAN FRANCISCO, CALIFORNIA.

METHOD OF BLEACHING PETROLEUM PRODUCTS WITH CLAY.

Application filed March 21, 1921. Serial No. 454,209.

*To all whom it may concern:*

Be it known that I, CHARLES WALCOTT STRATFORD, a citizen of the United States, residing at the city and county of San Francisco and State of California, have invented certain new and useful Improvements in Methods of Bleaching Petroleum Products with Clay, of which the following is a specification.

My invention relates in general to the art of bleaching or decolorizing petroleum products, and particularly to those methods or processes which involve the use of argillaceous material or "bleaching" earths, serving as a filtering agent for removing from said products the color bearing compounds, to the degree demanded by the trade.

Fuller's earth, either a variety imported from England, or a domestic variety from Florida, known as Floridin fuller's earth, is usually employed. But comparatively recently a deposit of good bleaching earth has been found in Death Valley, California. While the chemical analysis of this Death Valley clay is practically equivalent to that of Floridin fuller's earth, its physical characteristics are quite different, in that it completely disintegrates when brought into contact with water, and, therefore, it can be used only in an extremely finely divided condition; and, also, it contains water-soluble and acid-soluble compounds which interfere with the bleaching effect and which must be removed by treatment with sulfuric or other acid.

In another application, filed contemporaneously herewith, Serial Number 454,210, and which has since eventuated in Patent No. 1,408,655, dated March 7, 1922, I have disclosed a method of preparing this Death Valley clay for use as the filtering agent in bleaching or decolorizing petroleum products, and though my present invention, which consists in a novel method of bleaching such products, is not confined to the use of such prepared Death Valley clay, it is, in a sense, dependent upon the use of clay in a finely divided condition, from which all deleterious substances have been removed by a previous acid-treating process; and I have found in practice, that Death Valley clay is very suitable for my present method, in that its use affords a convenient, economical and practical continuous method of bleaching petroleum products.

The nature of my invention will be fully described in and ascertained by the following specification, in connection with the accompanying drawing in which the figure is a diagrammatic view of an apparatus suitable for carrying out my method.

Referring to the drawing—1 is a bin for the prepared clay. This clay is passed through a line 2 into a heater 3 from which a line 4 passes it to the first of a series of successively connected digesters 5 in which 6 indicates the mixing element.

7 is the tank for the unfiltered oil product to be bleached. 8 is an oil feed pump which through a line 9 delivers the oil to a heat interchanger 10 for such initial heating as may be afforded by the hot oil-filtrate passing back after treatment, as will presently appear. From this heat interchanger 10 the oil is passed through a line 11 to a second heat interchanger 12, in which steam is the heating fluid, the steam being supplied from a source at 13, through line 14, and the steam condensate passing off through line 15.

From the heat interchanger 12, the oil is fed by a line 16 to the first digester 5.

17 is a rotary filter, having tank 18, into which the last digester discharges by line 19.

The spent clay cake from the filter 17 is conducted by a conveyer 20 into the storage receptacle 21. The oil filtrate from the filter 17 is taken by lines 22 into a receiver 23, having a connected moisture trap 24 and vacuum pump 25. From the receiver 23 an evacuating pump 26 takes the hot oil-filtrate and passes it through a line 27 back into the first heat interchanger 10, wherein, as stated before, it gives up some of its heat to the infeeding unfiltered oil; and from this interchanger 10 said oil filtrate, passes by a line 28 through a possible cooler 29 to the filtered-oil tank 30.

31 is a line from the steam source 13 to the oil feed line 16, to provide for further regulating the temperature of the oil.

My method of bleaching the petroleum products as carried out in this apparatus is as follows:—The unfiltered oil from tank 7 is fed by the pump 8 in a continuous stream through the first heat interchanger 10 wherein it receives a modicum of heat from the hot oil-filtrate passing from the line 27 through said interchanger. Thence the stream of initially heated unfiltered oil passes through the second or steam-heated interchanger 12 wherein its temperature is raised to the desired point, say, for example, from 150 to 180 degrees, Fahr.

From the second heat interchanger 12 the stream of hot unfiltered oil is delivered to the first of the series of digesters 5. The prepared clay from bin 1 is passed in a continuous stream through the heater 3 and is delivered by line 4 into the first digester 5, say, for example, at a temperature of from 150 to 180 degrees Fahr.

Passing through the series of digesters the stream of unfiltered oil and the prepared clay is mechanically agitated and mixed. The mixture of oil and clay is then passed through line 19 into the tank 18 of the filter 17.

The spent clay is taken from the filter and passed through conveyer 20 to the clay storage receptacle. The hot oil filtrate passes from the filter 17, through lines 22 to the receiver 23, from which by the pump 26, it is passed through line 27 back into and through the first interchanger 10 giving up therein heat to the incoming unfiltered oil, and thence it is passed through the cooler 29 to the filtered oil tank 30.

The spent clay cake, containing some oil, may be allowed to remain in the receptacle 21, until it is removed for regeneration, in case it is to be used only once. But if the spent clay cake is to be used for the filtration of several oil products, before it is regenerated, said cake may be passed from the filter to the first of a second series of digesters where it is mixed with the unfiltered oil of a different filter line, through which it passes in the same manner as above described. Such spent clay cake may be used successively on a number of unfiltered oils with excellent results in decolorizing. Under such conditions, the first oil filtered with the clay is the lightest in color and the last, naturally, the darkest in color.

All operations are continuous, and in view of this it is pointed out that the plurality of successive digesters or mixers is of importance in that it provides for the proper function and effect of all the clay upon the oil. This will be better understood if compared with a single mixer and batch system. In such, the time period necessary for realizing the full effect of the clay may be regulated by prolonging the period until the clay is spent; but in a system such as herein disclosed in which the stream flow of oil and clay is continuous, some of the clay will pass out before its function is performed. In the present case this clay, passing into a second mixer will be utilized, and so on, the reducing percentage of unused clay, finding its way to and being used in succeeding mixers. In the practice of my invention I find it highly desirable to introduce the clarifying or decolorizing agent, as well as the petroleum product to be decolorized, at the maximum temperature at which the particular petroleum product being treated will not unduly oxidize. In this heated condition both petroleum product and decolorizing agent enter the first receptacle and being mixed therein at high temperature a more intimate contacting or commingling of the decolorizing agent and petroleum product is effected than if introduced at a low or normal temperature.

The relatively high temperature immediately at the start out of the mixing operation produces a decolorizing to the greatest degree possible in a single mixing receptacle; then, by overflowing the hot mixed product from the first receptacle into a second similar receptacle the decolorizing is further increased and expedited and by continuing to take the combined mixed product and overflowing it in like manner through a series of mixing receptacles the greatest possible degree in decolorizing is effected, through the intimacy of the hot mix. Finally the combined mixed product of petroleum and decolorizing agent is overflowed from the last mixing receptacle, hot, into the filter, it being highly desirable to separate, or filter out, the clarifying agent from the decolorized petroleum product before cooling, as the hot combined mixture enters the filter in a more fluid mass or with lower viscosity. The extreme intimacy of mix made possible by taking the hot mixed product and remixing it successively through a plurality of mixing receptacles, in accordance with my invention, makes for efficiency in decolorizing not possible to attain in a single mixing unit.

I claim:—

The method of clarifying and decolorizing petroleum products which consists in heating the clarifying agent, heating the petroleum product, continuously flowing the heated clarifying agent and heated petroleum product independently into a receptacle, mixing the hot petroleum product and hot clarifying agent therein, overflowing the combined hot mixed product from the said receptacle into a second receptacle, mixing the combined hot mixed product therein, overflowing the combined hot mixed product from the second named receptacle into a third receptacle and likewise mixing and overflowing the combined hot mixed product from the immediately preceding receptacle through a plurality of receptacles and filtering the combined hot mixed product overflowed from the last of said receptacles whereby to separate the clarifying agent and the decolorized petroleum product.

In testimony whereof I have signed my name to this specification.

CHARLES WALCOTT STRATFORD.